(12) United States Patent
Maruyama

(10) Patent No.: US 10,819,206 B2
(45) Date of Patent: Oct. 27, 2020

(54) MOVABLE COIL TYPE LINEAR MOTOR

(71) Applicant: HARMONIC DRIVE SYSTEMS INC., Shinagawa-ku, Tokyo (JP)

(72) Inventor: Toshiki Maruyama, Azumino (JP)

(73) Assignee: HARMONIC DRIVE SYSTEMS INC., Shinagawa-Ku, Tokyo (JP)

(*) Notice: Subject to any disclaimer, the term of this patent is extended or adjusted under 35 U.S.C. 154(b) by 274 days.

(21) Appl. No.: 16/073,169

(22) PCT Filed: Feb. 2, 2016

(86) PCT No.: PCT/JP2016/053103
§ 371 (c)(1),
(2) Date: Jul. 26, 2018

(87) PCT Pub. No.: WO2017/134750
PCT Pub. Date: Aug. 10, 2017

(65) Prior Publication Data
US 2019/0068043 A1   Feb. 28, 2019

(51) Int. Cl.
*H02K 41/035* (2006.01)
*G02B 7/04* (2006.01)
*H02K 11/21* (2016.01)

(52) U.S. Cl.
CPC ........... *H02K 41/0356* (2013.01); *G02B 7/04* (2013.01); *H02K 11/21* (2016.01)

(58) Field of Classification Search
CPC ..... H02K 1/34; H02K 11/22; H02K 33/12–18
USPC ........................................................ 310/12
See application file for complete search history.

(56) References Cited

U.S. PATENT DOCUMENTS

| 4,945,526 A * | 7/1990 | Jansen | G11B 7/08582 |
| | | | 369/44.11 |
| 5,347,500 A * | 9/1994 | Eguchi | G11B 7/08564 |
| | | | 369/44.14 |
| 9,800,128 B2 * | 10/2017 | Maruyama | G02B 7/023 |

(Continued)

FOREIGN PATENT DOCUMENTS

| JP | 2008-035645 A | 2/2008 |
| JP | 2013-3445 A | 1/2013 |

(Continued)

*Primary Examiner* — John K Kim
*Assistant Examiner* — Minki Chang
(74) *Attorney, Agent, or Firm* — Buchanan Ingersoll & Rooney PC

(57) ABSTRACT

A linear motor includes a motor movable body which has symmetrical structure with respect to a vertical plane and a horizontal plane that include the motor center axis line. Two linear bearings disposed in a space on the inner side of a rectangular tubular movable coil of the motor movable body are disposed symmetrically to the left and right of the center axis line so that the bearing support center coincides with the motor center axis line. Thrust generation sections of the motor movable body are disposed symmetrically above and below the motor center axis line, so that the thrust center coincides with the motor center axis line. Since the center of gravity of the motor movable body, the thrust center and the bearing support center coincide with the motor center axis line, a high responsive liner motor can be realized with no decrease in the thrust/movable body mass ratio.

5 Claims, 3 Drawing Sheets

(56) References Cited

U.S. PATENT DOCUMENTS

2008/0024015 A1* 1/2008 Tanioka ............ H02K 41/0356
                310/14

FOREIGN PATENT DOCUMENTS

| | | |
|---|---|---|
| JP | 2014-117024 A | 6/2014 |
| JP | 2016-010269 A | 1/2016 |

* cited by examiner

MOVABLE COIL TYPE LINEAR MOTOR

TECHNICAL FIELD

The present invention relates to a movable coil type linear motor for use in positioning an optical lens or the like, and particularly relates to a movable coil type motor capable of performing positioning with high responsiveness and high precision.

BACKGROUND ART

Movable coil type linear motors (linear actuators) that utilize a voice coil motor to highly responsively move and focus a lens, among other actions, are widely used. In the linear actuator disclosed in Patent Document 1, a linear guide, a lens mounting frame, a sensor for detecting the position of a movable body and other members are assembled in a vertically aligned state on the inner side of a tubular coil assembly to constitute a bilaterally symmetrical structure. With this configuration, the center of gravity of the movable body that performs a linear reciprocating motion is aligned with the center of the linear guide for guiding the movable body, whereby durability and precision of positioning are improved.

In a linear motor disclosed in Patent Document 2, portions of first and second end plates are bridged across the top and bottom sides of the tubular coil frame of the motor movable body to improve the rigidity of the tubular coil frame. With this configuration, the resonance frequencies of the linear motor can be increased to perform high-speed and high-precision positioning of an object to be moved mounted on the side of the motor movable body.

PRIOR ART DOCUMENTS

Patent Documents

Patent Document 1: JP 2008-35645 A
Patent Document 2: JP 2014-117024 A

SUMMARY OF THE INVENTION

Problems to be Solved by the Invention

In the linear motor disclosed in Patent Document 1, the components are installed in a vertically aligned state on the inner side of the tubular coil assembly to constitute a bilateral symmetrical structure, as mentioned above. This can make the bearing support center (G) and the thrust center (F) to coincide with each other on a vertical line where the center of gravity (M) of the movable body is positioned.

However, in order to make the respective positions to be the same (the same vertical coordinate) on the vertical line, it is necessary to design innovations in shape, structure and layout of the component parts. When the bearing support center (G) of the liner guide is set to coincide with the center of gravity (M) of the movable body, the left and right vertical sides of the rectangular-tubular-shaped driving coil are not utilized entirely as a thrust generating section in some cases in which the position of the thrust center (F) must be shifted in the vertical direction to coincide with the center of gravity (M) of the movable body. In addition, when the bearing support center (G) coincides with the thrust center (F), it is sometimes necessary that the center of gravity (M) of the movable body is adjusted in the vertical direction so as to coincide with the positions of the bearing support center and the thrust center by making use of a counterweight. In either case, acceleration or the thrust/movable body mass ratio decreases, which becomes a hindrance to the demand for high responsiveness.

In addition, the load mounting section of the movable body for mounting lens or the like is positioned offset in the vertical direction to the bearing support center (G) of the linear guide. Strictly speaking, there is occurred deviation in position in the vertical direction between the bearing support center (G) and the center of gravity (M) of the movable body due to the load mass.

Further, when the respective components are installed inside the rectangular-tubular-shaped coil assembly, the size of the coil assembly becomes comparatively large and sufficient rigidity cannot be obtained in some cases. For example, when the movable elements such as lens frame, sensor or the like are moved by thrust generated between the coil assemble and the permanent magnets on the stator side, the rectangular-tubular-shaped coil assembly cannot withstand the thrust and may be deformed. If the rectangular-tubular-shaped coil assembly is deformed during the movement of the movable elements, there is occurred a slight delay in the movement of the movable body and response property thereof is degraded. In addition, if the rigidity of the coil assembly is not sufficient, resonance is easy to occur in the coil assembly during operation. When resonance is occurred in the coil assembly, positioning responsiveness and positioning precision may be degraded.

In the linear motor disclosed in Patent Document 2, a limited number of parts including a lens mounting member and the like are disposed inside the coil assembly, a linear guide is disposed below the coil assembly and a sensor and other parts are disposed above the coil assembly. As a result, reinforcement end plates can be attached to the tubular coil assembly.

The respective components are arranged offset in the vertical direction inside or outside of the coil assembly in order to reinforce the coil assembly. Therefore, the inner space of the coil assembly can not be utilized efficiently. In addition, it is difficult for the bearing support center (G) and the thrust center (F) to coincide with the center of gravity (M) of the movable body.

In view of the above, an object of the present invention is to provide a movable coil type linear motor which is able to perform positioning of the movable body with good responsiveness while avoiding decrease in the thrust/movable body mass ratio.

Another object of the present invention is, in addition to the above object, to provide a movable coil type linear motor which is able to perform positioning of the movable body with high responsiveness and precision by securing the rigidity of the movable body.

Means of Solving the Problems

In order to realize the above objects, a movable coil type linear motor of the present invention has:

a motor movable body provided with a movable coil and a load attachment member to which a load member to be moved is attached;

a linear bearing for guiding the motor movable body in a direction along a motor center axis line;

a motor stator provided with a stator magnet that forms a magnetic circuit between the movable coil to generate a thrust for moving the motor movable body along the linear bearing; and a motor frame to which the motor stator is attached.

The movable coil is a laterally-elongated rectangular-tubular-shaped coil and is disposed symmetrically with respect to a vertical plane and a horizontal plane, both planes including the motor center axis line;

the linear bearing includes a left linear bearing and a right linear bearing that have an identical shape and that are disposed at bilaterally symmetrical positions with respect to the motor center axis line and pass through an inner space of the movable coil;

the load attachment member is a member having a shape that is symmetric laterally and vertically, has a center section to which the load member is attached, and is disposed symmetrically with respect to the vertical plane and the horizontal plane in the inner space of the movable coil;

the motor stator is provided with an upper yoke and a lower yoke having an identical shape, and an upper magnet and a lower magnet having an identical shape as the stator magnet;

the upper magnet is attached to the upper yoke so as to face a coil top side, which is one long side of the movable coil, across a fixed gap, and the lower magnet is attached to the lower yoke so as to face a coil bottom side, which is the other long side of the movable coil, across a fixed gap; and the upper yoke and the upper magnet are disposed symmetrically relative to the lower yoke and the lower magnet with respect to both of the vertical plane and the horizontal plane.

In the movable coil type linear motor of the present invention, the load attachment member and the linear bearing are disposed by making use of the inner space of the rectangular-tubular-shaped movable coil. This can achieve compactness of the linear motor.

In addition, the center of the load attachment member is made to coincide with the motor center axis line, and two sets of linear bearings are disposed at bilateral symmetrical positions with respect to the motor center axis line so that the bearing support center (G) of the linear bearing coincides with the position of the motor center axis line in the vertical direction. Furthermore, the thrust generation sections are disposed symmetrically in the vertical direction with respect to the motor center axis line so that the thrust center (F) coincides with the motor center axis line in the vertical direction.

This can secure symmetry of the motor movable body to the motor center axis line in the vertical and lateral directions. In addition, it is possible for the center of gravity (M) of the motor movable body, the thrust center (F) and the bearing support enter (G) to align on the motor center axis line without causing decrease in utilization ratio of the thrust generation sections due to adjustment of thrust center position, or without causing addition of weight to adjust the position of the center of gravity. As a result, it is possible to realize a movable coil type linear motor which is able to perform high response positioning without decrease in the thrust/movable body mass.

In the movable coil type linear motor of the present invention, it is desirable that:

the upper yoke be provided with an upper concave part opening to a first side that is one side in a direction along the motor center axis line and the upper magnet be attached to an inner side of the upper concave part;

the lower yoke be provided with a lower concave part opening to the first side and the lower magnet be attached to an inner side of the lower concave part; and the coil top side of the movable coil be inserted into the upper concave from the first side so as to face the upper magnet at a fixed gap in the vertical direction, and the coil bottom side of the movable coil be inserted into the lower concave part so as to face the lower magnet at a fixed gap in the vertical direction.

In this case, it is desirable that:

a coil frame of the movable coil be provided with a rectangular-tubular-shaped coil guide part around which a coil winding is wound, and a left support pillar part and a right support pillar part having an identical shape for linking a coil-guide-part upper side and a coil-guide-part lower side of the coil guide part at a first-side section of the coil guide part;

the left support pillar part and the right support pillar part protrude from the coil-guide-part upper side and the coil-guide-part lower part to the first side by a prescribed amount; and the right support pillar part and the left support pillar part be disposed symmetrically with respect to the vertical plane and the horizontal plane.

In this way, the magnetic circuits by the stator magnets are formed in a state opening on one direction along the motor center axis line, so that the yoke, the magnet or other component parts for constituting the magnetic circuits are not disposed at the magnetic-circuit opening side of the movable coil. Therefore, the reinforcing support pillars for linking the coil upper side and the coil lower side of the movable coil can be formed in the coil frame of the movable coil in order to increase the rigidity of the movable coil. In addition, it is also possible to link between the left vertical side of the coil frame (left vertical side of the coil guide part) and the left support pillar part, and between the right vertical side (right vertical side of the coil guide part) and the right support pillar part, to thereby further increase the rigidity of the movable coil.

Since the rigidity of the coil frame can be increased, delay in movement of the motor movable body due to deformation of coil frame during moving operation of the motor movable body, especially during acceleration operation thereof, decrease in positional detection accuracy of the load member, or other defects can be prevented or suppressed. Whereby, it is possible to realize a movable coil type linear motor which is able to perform positioning of the movable body with high responsiveness and high precision.

In the present invention, a cylinder type linear bearing provided with a linear bearing guide shaft extending in a direction of the motor center axis line and a linear bearing outer cylinder can be employed as the left linear bearing and the right linear bearing.

The linear bearing guide shafts are respectively attached to the motor frame. The movable-side linear-bearing outer cylinders are respectively attached to linear-bearing outer-cylinder holding parts formed respectively in the left support pillar part and the right support pillar part. In this case, it is desirable that the linear-bearing outer-cylinder holding parts be respectively formed with guide-shaft hole for the respective linear bearing guide shafts to pass through, and that the load attachment member be attached to the coil frame in a state bridging across the linear-bearing outer-cylinder holding parts.

In this way, the motor movable body can be supported by the left and right linear bearings with making use of the left support pillar part and the right support pillar part which are formed in the coil frame to increase the rigidity thereof. Accordingly, it is possible to constitute sections for attaching the linear-bearing outer cylinders and the load attachment member in a compact manner, which is advantageous in reducing the size, weight and manufacturing costs of the motor movable body.

Next, it is possible in the present invention that the motor frame be constituted by a first end plate and a second end plate, and that a coil frame be disposed between the first and second end plates in the motor center axis line. In this case, the upper yoke and the lower yoke be fixed to one of the first and second end plates and the linear bearing guide shafts be respectively supported by these first and second end plates in a state bridging across the first and second end plates.

In addition, a position detection unit for detecting a position of the motor movable body is constituted by a movable-side detection unit and a fixed-side detection unit. In this case, the coil left side and the coil right side of the movable coil are formed with detection-unit attachment parts, and the movable-side detection section is mounted on one of the detection-section attachment part. The fixed-side detection part is attached to the first and second endplates to face the movable-side detection unit.

In the present invention, the motor frame which is a structural member of the linear motor and the motor stator which is the yoke and is a part for constituting the magnetic circuit are made to be separate component parts. The parts for constituting the magnetic circuit and those for constituting the detection unit are respectively attached to the motor frame. Therefore, it becomes easy to secure accuracy in relation to the attachment of these parts, whereby improving part assembly feasibility. The mass of the movable-side detection unit, which is attached to the left or right-side section of the motor movable body, is small enough to substantially maintain the symmetry of the motor movable body.

The movable coil type linear motor of the present invention can be used as a lens drive mechanism. The movable coil type linear motor in this case has an optical lens as a load member attached to the load attachment member, and the optical lens is attached so that the lens optical axis coincides with the motor center axis line. In addition, the first and second end plates are formed with an opening centered on the motor center axis line for a light beam to pass through.

MODE FOR CARRYING OUT THE INVENTION

An embodiment of a movable coil type linear motor according to the present invention is described below with reference to the drawings. The movable coil type linear motor of this embodiment is used as a lens-driving linear actuator for, e.g., focusing a lens. As shall be apparent, the movable coil type linear motor of the present invention can also be used to cause a load member (object to be moved) other than a lens to perform a linear reciprocating motion.

Figure 1:
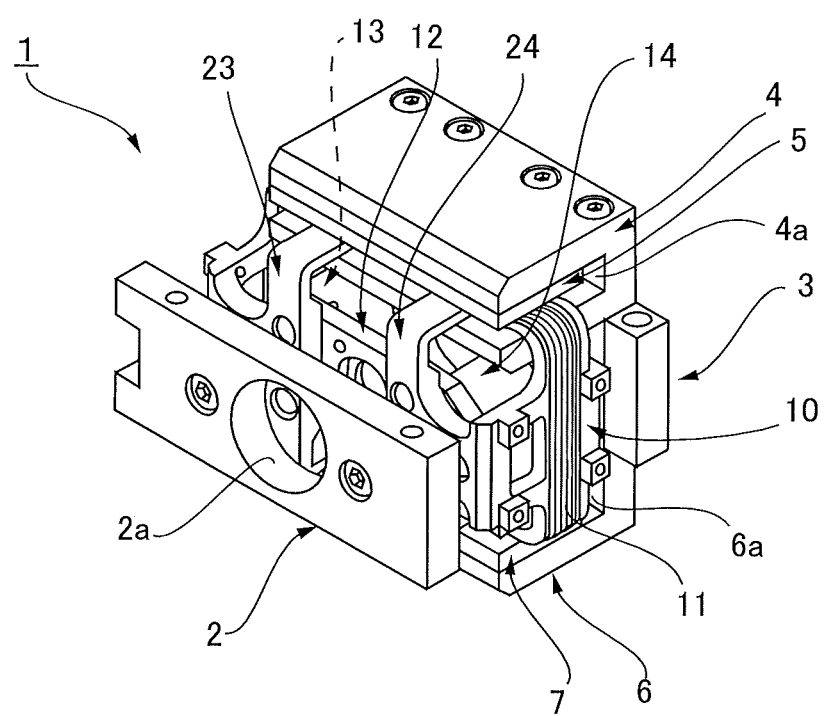
FIG. 1 is a perspective view illustrating a movable coil type linear motor according to the present invention.
Figure 2:
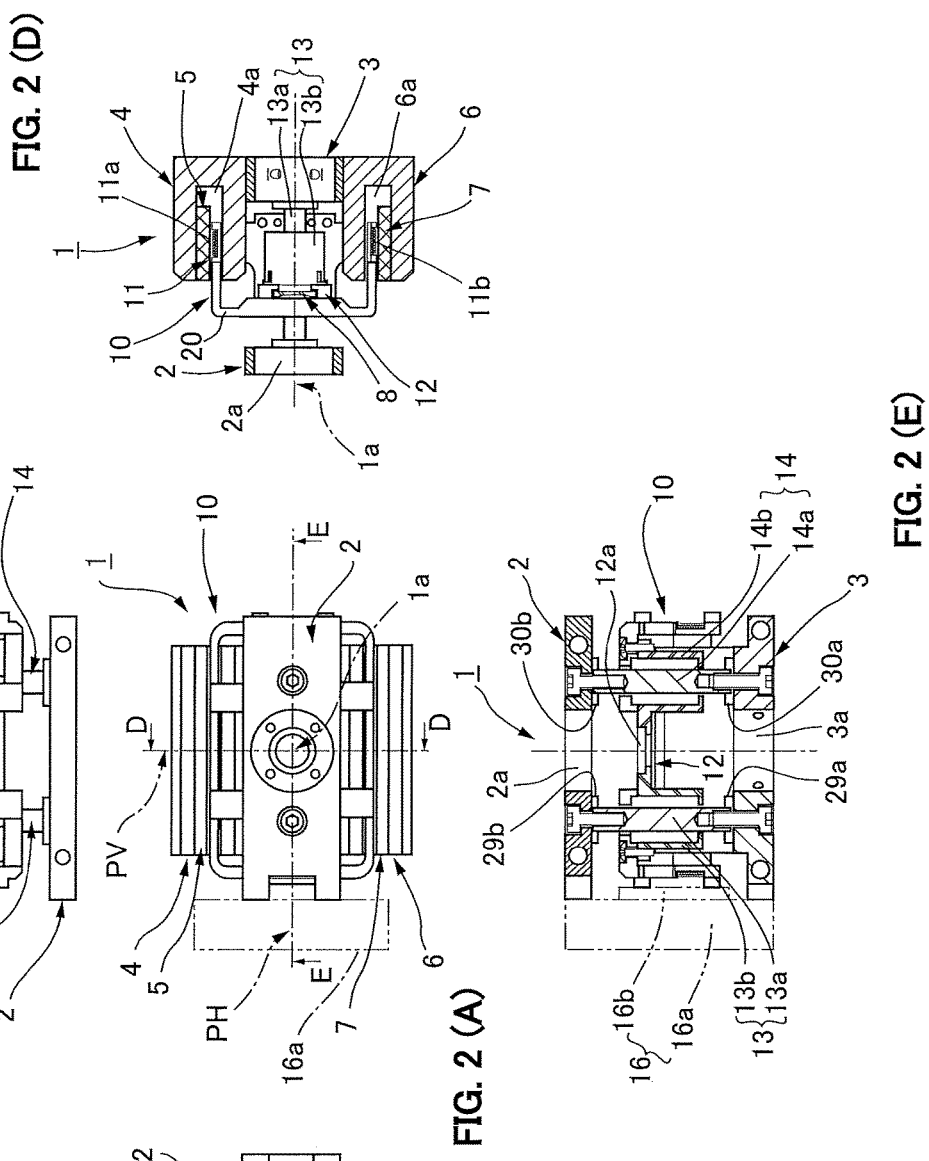
FIGS. 2(A)-2(E) include a front view, plan view, side view, a line D-D cross-sectional view, and a line E-E cross-sectional view illustrating the movable coil type linear motor of FIG. 1.
Figure 3:
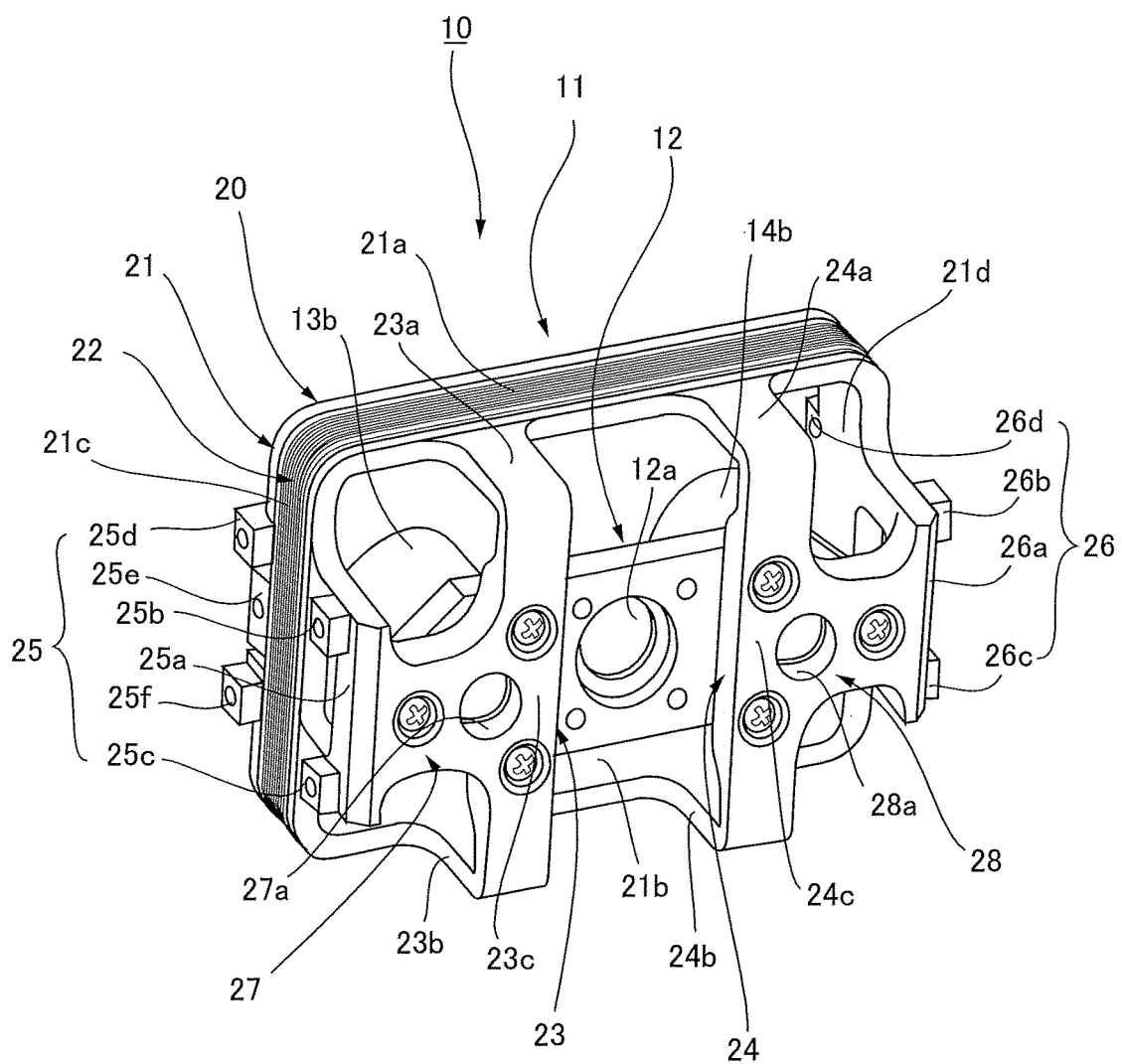
FIG. 3 is a perspective view illustrating a motor movable body of the movable coil type linear motor of FIG. 1.

FIG. 1 is a perspective view illustrating a main portion of the movable coil type linear motor according to the present embodiment. FIG. 2(A) is a front view illustrating the movable coil type linear motor, FIG. 2(B) is a plan view thereof, FIG. 2(C) is a side view thereof, FIG. 2(D) is a cross-sectional view illustrating a portion cut along line D-D of FIG. 2(A), and FIG. 2(E) is a cross-sectional view illustrating a portion cut along line E-E of FIG. 2(A). FIG. 3 is a perspective view illustrating a motor movable body thereof.

With reference to these drawings, the movable coil type linear motor 1 (simply refer to as a "linear motor 1" hereafter) is provided with a motor frame constituted by a front endplate 2 and a rear end plate 3 disposed at a fixed gap in a motor longitudinal direction. The front end plate 2 and the rear end plate 3 are a laterally elongated rectangular plate having a fixed thickness.

A upper yoke 4 is mounted on the upper end surface of the rear end plate 3, and an upper magnet 5 is mounted on the upper yoke 4. A lower yoke 6 is mounted on the lower end surface of the rear end plate 3, and a lower magnet 7 is mounted on the lower yoke 6. A motor stator is constituted by the upper yoke 4, the upper magnet 5, the lower yoke 6 and the lower magnet 7.

The upper yoke 4 and the lower yoke 6 have the same shape, and are mounted on the rear end plate 3 so that they are positioned symmetrically with respect to the vertical plane PV and the horizontal plane PH (see FIG. 2(A)) that include the motor center axis line 1a extending horizontally in the motor longitudinal direction. Similarly, the upper magnet 5 and the lower magnet 7 have the same shape, and are mounted respectively on the upper yoke 4 and the lower yoke 6 so that they are positioned symmetrically to the vertical plane PV and the horizontal plane PH.

The upper yoke 4 and the lower yoke 6 are open on the motor front side and are provided with concave parts 4a and 6a which have a constant width and a constant depth and extend horizontally in the motor lateral direction. The concave parts 4a and 6a have left and right open ends. The concave part 4a of the upper yoke 4 has a downward-facing upper end surface inside thereof and the rectangular plate-like upper magnet 5 having a constant thickness is mounted horizontally on the upper end surface, while the concave part 6a of the lower yoke 6 has an upward-facing lower end surface inside thereof and the rectangular plate-like lower magnet 7 having a constant thickness is mounted horizontally on the upward-facing lower end surface.

A motor movable body 10 is disposed in a state movable along the motor center axis line 1a with respect to the motor stator as constituted above. A lens attachment plate 12 having a laterally elongated rectangular-shape (load attachment member) is mounted on the motor movable body 10. An optical lens 8 having a circular profile, which is a load member to be moved, is mounted on the lens attachment plate 12 (see FIG. 2(D)).

The motor movable body 10 is supported by left and right linear bearings 13 and 14. The linear bearings 13 and 14 are a cylinder type linear bearing having the same shape and structure and are disposed to pass through the inner space of the rectangular-tubular-shaped movable coil 11. The linear bearings 13 and 14 are respectively provided with linear-bearing guide shafts 13a, 14a and linear bearing outer cylinders 13b, 14b that are slidable along the linear-bearing guide shafts 13a, 14a.

The linear-bearing guide shafts 13a, 14a are fixed to the front end plate 2 and the rear end plate 3 by bolts so that they are positioned symmetrically to the vertical plane PV and the horizontal plane PH. The linear bearing outer cylinders 13b, 14b are attached to the movable coil 11 so that they are positioned symmetrically to the vertical plane PV and the horizontal plane PH.

As illustrated by imaginary lines in FIGS. 2(A) and 2(E), a position detection unit 16 for detecting the position of the motor movable body 10, namely the position of the optical lens 8 mounted thereon is mounted on the linear motor 1. The position detection unit 16 is, e.g., an optical position detector which is provided with a fixed-side position detection unit 16a mounted on the motor frame (the front end plate 2 and the rear end plate 3) and a movable-side position detection unit 16b mounted on the motor movable body 10.

Referring mainly to FIG. 3, the motor movable body 10 is provided with a movable coil 11 having a laterally-elongated rectangular tubular shape. A lens attachment plate 12, and linear-bearing outer cylinders 13b and 14b of the linear bearings 13 and 14 are mounted on the movable coil 11.

The movable coil 11 is provided with a coil frame 20. The coil frame 20 is formed with a coil guide part 21 having a laterally-elongated rectangular tubular shape. A coil winding 22 is wound around the outer peripheral surface of the coil guide part 21.

Two support pillar parts 23 and 24 are integrally formed in a section of the coil guide part 21 on the first side in the direction of the motor center axis line 1a, the first side being on the motor front side in this example. The two support pillar parts 23 and 24 are of identical shape and are disposed in positions that are bilaterally symmetric with respect to the center of the coil frame 20.

The support pillar part 23 is so shaped as to be provided with: top and bottom protruding parts 23a and 23b protruding horizontally by a fixed length from the coil-guide-part top side 21a and the coil-guide-part bottom side 21b to the motor front side; and a linking part 23c extending in the motor vertical direction to connect between the top and bottom protruding parts 23a and 23b. Similarly, the other support pillar part 24 is so shaped as to be provided with top and bottom protruding parts 24a and 24b and a linking part 24c.

The coil guide part 21 also has coil-guide-part vertical sides 21c and 21d on both sides thereof, and the coil-guide-part vertical sides are integrally formed with detection-unit attachment parts 25 and 26. The detection-unit attachment part 25 is provided with a linking part 25a that extends vertically to link the tips of the top and bottom horizontal arm parts extending toward the motor front side, and the linking part 25a is formed with a pair of top and bottom mounting seats 25b and 25c that protrude laterally. The coil guide part 21 is also formed on the motor rear side section with mounting seats 25d, 25e and 25f. The movable-side position detection unit 16b of the position detection unit 16 can be attached to these mounting seats 25b to 25f.

The other detection-unit attachment part 26 is also similarly configured and is provided with mounting seats 26b and 26c formed on a linking part 26a that links tips of the top and bottom horizontal arm parts and three mounting seats formed on the rear side section of the coil guide part 21 (only the mounting seat 26d is illustrated in the drawing). The movable-side position detection unit 16b can be attached to these mounting seats.

Furthermore, the linking part 25a of the detection-unit attachment part 25 and the linking part 23c of the support pillar part 23 are linked together in the motor lateral direction, and the linking portion between them is formed with a linear-bearing outer-cylinder holding part 27. The linear-bearing outer-cylinder holding part 27 is formed with circular guide shaft hole 27a for the linear-bearing guide shaft 13a of the linear bearing 13 to pass through. The linear-bearing outer cylinder 13b of the linear bearing 13 is fastened by bolts to fix to the linear-bearing outer-cylinder holding part 27 from the motor rear side so as to be coaxial with the guide shaft hole 27a.

A linear-bearing outer-cylinder holding part 28 is similarly formed between the linking part 26a of the other detection-unit mounting part 26 and the linking part 24c of the support pillar part 24. The linear-bearing outer-cylinder holding part 28 is formed with a circular guide shaft hole 28a. In addition, the linear-bearing outer cylinder 14b of the linear bearing 14 is fastened by bolts to fix to the linear-bearing outer-cylinder holding part 28 from the motor rear side so as to be coaxial with the guide shaft hole 28a.

Here, the lens attachment plate 12 is mounted on the coil frame 20 in a manner bridged across the left and right linear-bearing outer cylinders 13b and 14b along the motor lateral direction, the linear-bearing outer cylinders being fixed to the coil frame 20 by bolts.

The motor movable body 10 is supported by the left and right linear bearings 13 and 14 so as to be symmetric with respect to the vertical plane PV and the horizontal plane PH. In addition, the movable coil 11 thereof is disposed to face the upper magnet 5 and the lower magnet 7 on the motor stator side across a fixed gap. Specifically, as is apparent from FIGS. 1 and 2(D), the coil top side 11a and the coil bottom side 11b are inserted into the concave parts 4a and 6a of the upper yoke 4 and the lower yoke 6 on the motor stator side, and are in a state facing the upper magnet 5 and the lower magnet 7 across a fixed gap. With this, magnetic circuits (thrust generation parts), which are capable of generating thrust to move the motor movable body 10 in the motor longitudinal direction along the left and right linear bearings 13 and 14, are formed in a symmetric state with respect to the vertical plane PV and the horizontal plane PH.

The coil frame 20 of the movable coil 11 in the motor movable body 10 is formed with the support pillar parts 23 and 24 on the motor front side thereof. The support pillar parts 23 and 24 are respectively shapes so as to protrude from the rectangular tubular coil guide part 21 to the motor front side by a fixed amount. An appropriate setting of the amount of protrusion allows for the motor movable body 10 to move in the motor longitudinal direction with a fixed stroke without interfering with the components of the motor stator side. As illustrated in FIG. 2(E), stoppers 29a, 29b, 30a and 30b made of buffer material are attached to the both end parts of the linear-bearing guide shafts 13a and 14a of the linear bearings 13 and 14.

Next, in the case of the linear motor 1 for use in a lens drive mechanism, the lens attachment plate 12 is formed with a lens attachment part 12a having a circular through hole. In addition, the front endplate 2 and the rear end plate 3 are respectively formed with circular through holes centered on the motor center axis line 1a as the opening parts 2a and 3a for allowing light beam to pass through (see FIG. 2(E)).

In the linear motor 1 as constituted above, the lens attachment plate 12 and the two linear bearings 13 and 14 are disposed by making use of the inner space of the rectangular tubular movable coil 11. As a result, the linear motor 1 can be made compact.

In addition, the center of the lens attachment plate 12 is made to coincide with the motor center axis line 1a, and the two sets of linear bearings 13 and 14 are disposed symmetrically on both sides of the motor center axis line 1a so that the bearing support center of the motor movable body 10 coincides with the motor center axis line 1a in the vertical direction. Furthermore, the thrust generation parts are disposed symmetrically in the vertical direction with respect to the motor center axis line 1*a* so that the thrust center thereof coincide with the motor center axis line 1*a* in the vertical direction.

As a result, the symmetry of the motor movable body 10 can be secured both vertically and laterally with respect to the motor center axis line 1*a*. In addition, it is possible for the center of gravity of the motor movable body, the thrust center and the bearing support center to coincide with the motor center axis line 1*a* without addition of weight to adjust the position of center of gravity, decline in utilization of the thrust generation parts to adjust the position of the thrust center or the like. Therefore, the linear motor 1, which is capable of positioning the movable body with high precision, can be realized without decrease in the thrust/movable body mass raio.

The invention claimed is:

1. A movable coil type linear motor comprising:
   a motor movable body provided with a movable coil and a load attachment member to which a load member to be moved is attached;
   a linear bearing for guiding the motor movable body in a direction along a motor center axis line;
   a motor stator provided with a stator magnet that forms a magnetic circuit between the movable coil to generate a thrust for moving the motor movable body along the linear bearing; and
   a motor frame to which the motor stator is attached,
   wherein the movable coil is a laterally-elongated rectangular tubular coil and is disposed symmetrically with respect to a vertical plane and a horizontal plane, both planes including the motor center axis line;
   the linear bearing is provided with a left linear bearing and a right linear bearing that are of identical shape and that are disposed at bilaterally symmetrical positions with respect to the motor center axis line and pass through an inner space of the movable coil;
   the load attachment member is a member having a shape symmetric vertically and laterally, has a center section to which the load member is attached, and is disposed symmetrically with respect to the vertical plane and the horizontal plane in the inner space of the movable coil;
   the motor stator is provided with an upper yoke and a lower yoke having an identical shape, and an upper magnet and a lower magnet having an identical shape as the stator magnet;
   the upper magnet is attached to the upper yoke so as to face a coil top side, which is one long side of the movable coil, across a fixed gap, and the lower magnet is attached to the lower yoke so as to face a coil bottom side, which is the other long side of the movable coil, across a fixed gap; and
   the upper yoke and the upper magnet are disposed relative to the lower yoke and the lower magnet symmetrically with respect to the vertical plane and the horizontal plane;
   wherein the upper yoke is provided with an upper concave part opening on a first side that is one side in a direction along the motor center axis line, and the upper magnet is attached to an inner side of the upper concave part;
   the lower yoke is provided with a lower concave part opening on the first side, and the lower magnet is attached to an inner side of the lower concave part;
   the coil top side of the movable coil is inserted into the upper concave from the first side so as to face the upper magnet across a fixed gap in the vertical direction, and the coil bottom side of the movable coil is inserted into the lower concave part so as to face the lower magnet across a fixed gap in the vertical direction;
   a coil frame of the movable coil is provided with a rectangular tubular coil guide part around which a coil winding is wound, and a left support pillar and a right support pillar part having an identical shape for linking a coil-guide-part top side and a coil-guide-part bottom side of the coil guide part in a section of the coil guide part on the first side;
   the left support pillar part and the right support pillar part protrude by a prescribed amount from the coil-guide-part top side and the coil-guide-part bottom part to the first side; and
   the right support pillar part and the left support pillar part are disposed symmetrically with respect to the vertical plane and the horizontal plane.

2. The movable coil type linear motor according to claim 1,
   wherein the left linear bearing and the right linear bearing are respectively provided with a linear-bearing guide shaft extending in a direction of the motor center axis line and a linear-bearing outer cylinder that is slidable along the linear-bearing guide shaft;
   the linear-bearing guide shafts are respectively attached to the motor frame;
   the linear-bearing outer cylinders are respectively attached to linear-bearing outer-cylinder holding parts formed respectively in the left support pillar part and the right support pillar part;
   the linear-bearing outer-cylinder holding parts are respectively formed with guide-shaft hole for the respective linear-bearing guide shafts to pass through; and
   the load attachment member is attached to the coil frame in a state bridging across the linear-bearing outer-cylinder holding parts.

3. The movable coil type linear motor according to claim 2,
   wherein the motor frame is provided with a first end plate and a second end plate;
   the coil frame is disposed between the first and second end plates in the direction of the motor center axis line;
   the upper yoke and the lower yoke are fixed to one of the first and second end plates; and
   the linear-bearing guide shafts are respectively supported by the first and second end plates in a state bridging across the first and second end plates.

4. The movable coil type linear motor according to claim 3,
   further comprising a position detection unit for detecting a position of the motor movable body,
   wherein the position detection unit is provided with a movable-side detection unit and a fixed-side detection unit;
   the movable coil is provided with detection-unit attachment parts on both coil vertical sides thereof for attaching the movable-side detection unit;
   the movable-side detection unit is attached to one of the detection-unit attachment parts; and
   the fixed-side detection unit is attached to the first and second end plates to face the movable-side detection unit.

5. The movable coil type linear motor according to claim 3,
   further comprising a load member attached to the load attachment member;

wherein the load member is an optical lens attached so that a lens optical axis thereof coincides with the motor center axis line; and the first and second end plates are formed with an opening centered on the motor center axis line for a light beam to pass through.

* * * * *